United States Patent [19]

Patriquin

[11] 4,280,601
[45] Jul. 28, 1981

[54] SHOCK ABSORBER WITH IMPROVED PISTON COMPRESSION VALVE MECHANISM

[75] Inventor: William G. Patriquin, Mississauga, Canada

[73] Assignee: Gabriel of Canada Limited, Toronto, Canada

[21] Appl. No.: 52,128

[22] Filed: Jun. 21, 1979

[51] Int. Cl.$^3$ .............................................. F16F 9/34
[52] U.S. Cl. ................................... 188/316; 137/529; 277/216; 277/236
[58] Field of Search ............... 188/282, 288, 316, 317; 137/512.1, 529; 277/37, 71, 216, 236; 16/51, 52, 66

[56] References Cited

U.S. PATENT DOCUMENTS

| 1,474,024 | 11/1923 | Cowles | 277/236 |
|---|---|---|---|
| 1,965,294 | 7/1934 | Marshall | 277/216 |
| 2,497,972 | 2/1950 | Beecher | 188/316 |
| 2,507,267 | 5/1950 | Patriquin . | |
| 2,507,268 | 5/1950 | Patriquin | 188/316 |
| 3,997,037 | 12/1976 | Schupner | 16/51 X |
| 4,109,767 | 8/1978 | Nandyal et al. . | |

FOREIGN PATENT DOCUMENTS 705301 3/1954 United Kingdom ................... 188/282

Primary Examiner—George E. A. Halvosa
Attorney, Agent, or Firm—Cushman, Darby & Cushman

[57] ABSTRACT

An improved piston compression valve mechanism for a double acting shock absorber which includes an upwardly facing annular valve seat on the piston. A washer member is fixed to the piston above the valve seat. The exterior periphery of the piston between the valve seat and washer includes six annularly spaced radially outwardly facing arcuate surfaces. Six coil springs are mounted with their upper ends engaging the washer member and their inner exterior peripheries adjacent the arcuate surfaces. A lower spring support including an outer cylindrical peripheral wall is disposed in surrounding relation to the outer exterior peripheries of the coil springs. An inwardly projecting flange and six radially inwardly projecting portions extend toward and adjacent to the arcuate surfaces which are in supported relation to the lower ends of the coil springs. An annular seal and carrier assembly is disposed below the spring support flange and is resiliently biased downwardly into engagement with the valve seat by the coil springs.

9 Claims, 4 Drawing Figures

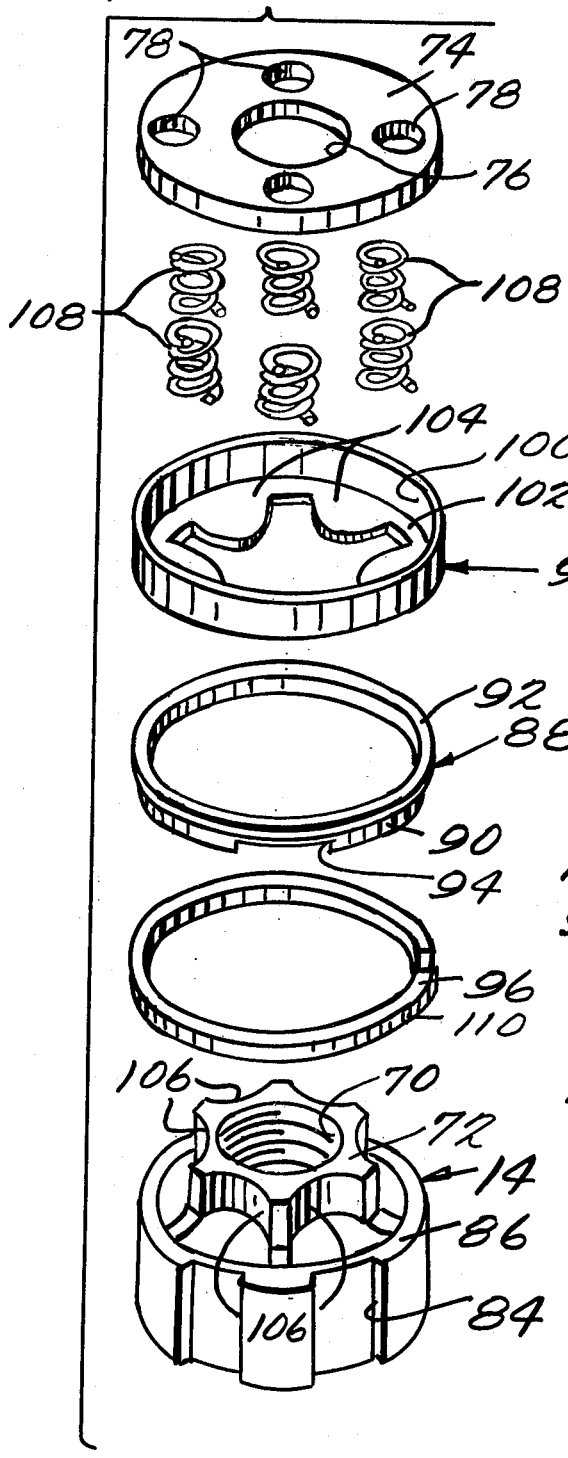
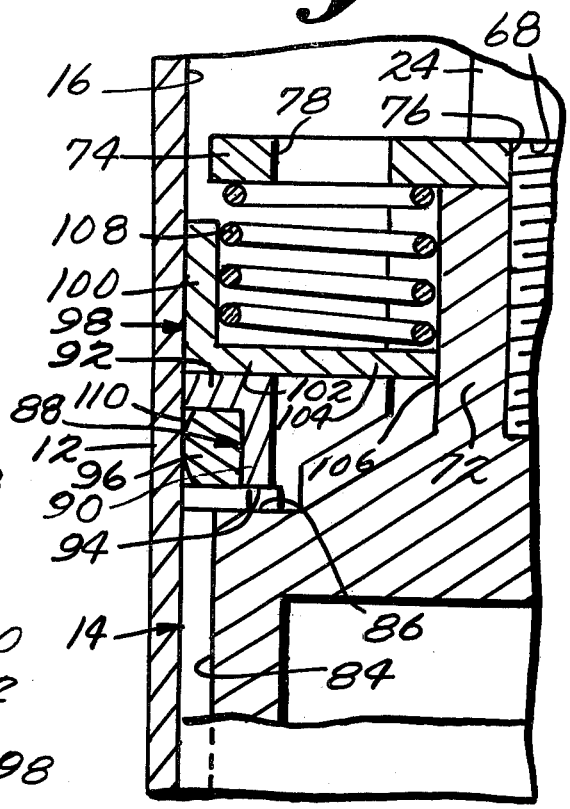
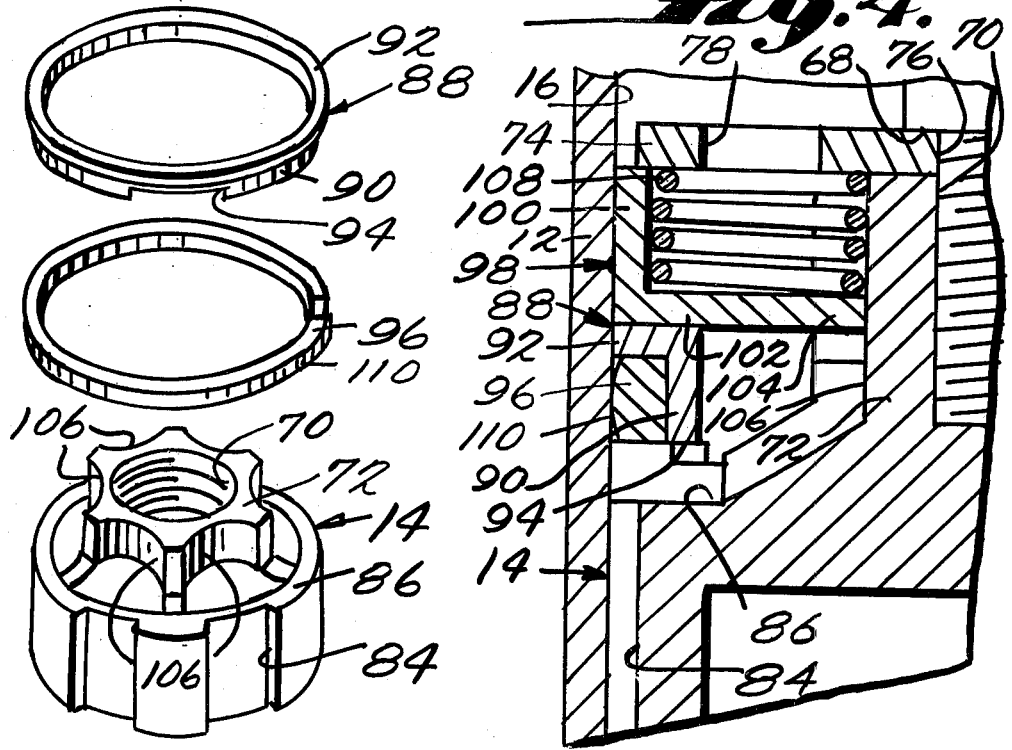

SHOCK ABSORBER WITH IMPROVED PISTON COMPRESSION VALVE MECHANISM

The present invention relates to hydraulic shock absorbers of the direct double acting tubular type, and more particularly to an improved piston compression valve for this type of shock absorber.

Direct double acting tubular shock absorbers utilized on automotive vehicles having spring-suspended frames usually comprise a cylinder attached to the axis of the vehicle and a piston in the cylinder which is connected with the frame so that when the wheels of the vehicle pass over an uneven surface the piston and cylinder move relative to one another. The cylinder contains a suitable damping fluid which is expelled from one end of the cylinder into a reservoir when the axle and frame move toward one another, relatively. This action is referred to as the compression stroke of the shock absorber and in many instances the valving within the shock absorber is designed to restrict the flow of fluid from the cylinder during the compression stroke and thus restrain the motion of the vehicle. When the cylinder and piston move in the opposite direction, after compression, i.e. on recoil, it is desirable to cause the oil to freely re-enter the cylinder so that the tendency of the piston to create a vacuum in the cylinder is obviated by the relatively free entrance of oil into the cylinder.

The present invention is more particularly directed to an improved piston compression valve assembly of the type which is adapted to control the flow of hydraulic fluid from the compression space of the unit to the rebound space around the periphery of the piston. The improved piston compression valve mechanism of the present invention importantly provides a series of (e.g. six) relatively short coil springs for resiliently biasing the annular peripheral sealing element of the valve mechanism into sealing relation. By providing a series of relatively short annularly spaced coil springs positioned in accordance with the structural arrangement hereinafter described a reduction in the vertical height of the piston can be achieved while at the same time achieving a greater uniformity in the spring pressure applied during operation.

Accordingly it is an object of the present invention to provide a shock absorber having an improved piston compression valve assembly of the type described.

Another object of the present invention is to provide a shock absorber having an improved piston compression valve assembly which is simple in construction, economical to manufacture and effective in operation.

These and other objects of the present invention will become more apparent during the course of the following detailed description and appended claims.

The invention may best be understood with reference to the accompanying drawings, wherein an illustrative embodiment is shown.

In the drawings:

FIG. 2 is an exploded view of the component parts of the piston compression valve mechanism and piston;

FIG. 3 is an enlarged fragmentary sectional view illustrating the position of the parts of the piston compression valve mechanism of the present invention during an initial compressive movement; and FIG. 4 is a view similar to FIG. 3 showing the parts moved into their limiting position during a subsequent compressive movement.

Figure 1:
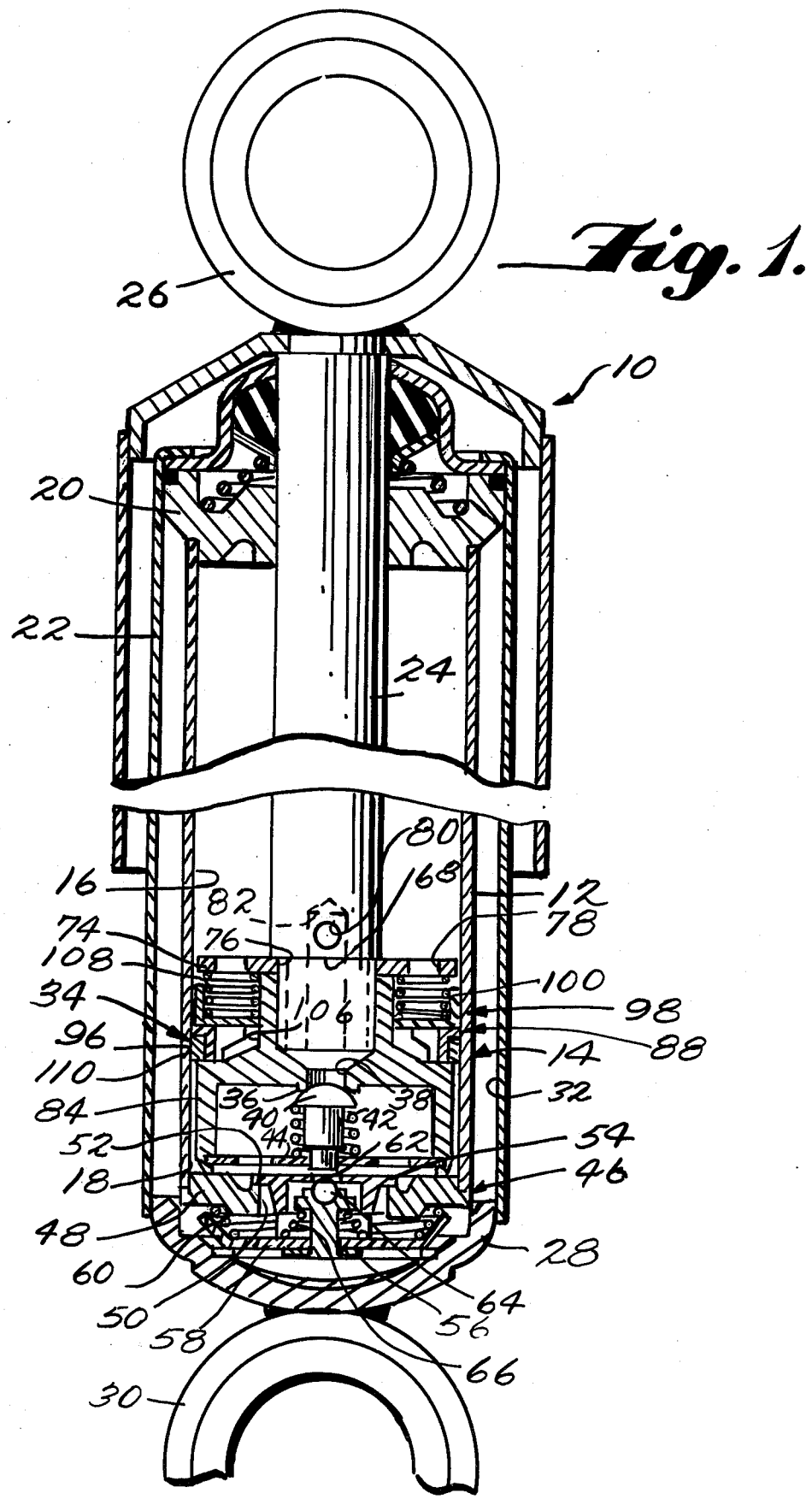
FIG. 1 is a vertical sectional view of a shock absorber embodying the principles of the present invention.

Referring now more particularly to FIG. 1 of the drawings, there is shown therein a direct action hydraulic shock absorber, generally indicated at 10, adapted to be connected between the sprung and unsprung masses of a vehicle, which embodies the principles of the present invention.

In general, it can be stated that the unit 10 is constructed in the manner set forth in commonly-assigned U.S. Pat. No. 2,507,267, and hence the disclosure of this patent is hereby incorporated by reference into the present specification. For present purposes it is sufficient to note that the shock absorber 10 includes an inner tubular member 12, which defines a cylindrical chamber within which is slidably mounted a piston assembly 14. The piston 14 divides the cylinder into an upper rebound space 16 and a lower compression space 18. The upper end of the tubular member 12 has an end closure assembly 20 fixed thereto, which end closure assembly also receives the upper end of an outer tubular member 22.

The end closure assembly 20 serves to slidably sealingly engage the exterior periphery of a piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the outer tubular member 22. In order to control the flow of hydraulic fluid from the compression space 18 into the rebound space 16 during the compression movement of the shock absorber 10, there is provided in the piston 14 an improved spring pressed piston compression valve mechanism, generally indicated at 34, embodying the principles of the present invention hereinafter to be more fully described.

The piston 14 also defines a downwardly facing annular valve seat 36 which is disposed intermediate the opposite ends of the piston in surrounding relation to a central passage 38. A rebound valve 40 is disposed in cooperating relation with the valve seat 36. As best shown in FIG. 1, the valve 40 is resiliently urged into engagement with the seat 36 by a coil spring 42, one end of which engages the valve 40 and the opposite end of which engages an insert spider 44 fixed within the adjacent end of the piston assembly 14.

In order to accommodate the piston rod displacement during the telescopic movements of the unit, there is provided a base assembly, generally indicated at 46, which is positioned adjacent the lower end closure 28. The base assembly 46 includes a combined compression and replenishing valve which is constructed generally in accordance with the disclosure contained in U.S. Pat. No. 4,109,767, the disclosure of which is hereby incorporated by reference into the present specification. For present purposes it is sufficient to note that the base assembly 46 includes a base member 48 which is fixedly connected with the lower end of the inner tubular member 12 and the interior of the end closure 28. The periphery of the base member 48 provides passages between the replenishing space 32 and the space between the base member 48 and end closure 28. Formed in the central portion of the member 48 is a central opening 50 having an upwardly facing valve seat 52 surrounding the upper end thereof. A replenishing valve member 54 is mounted within the opening 50 so that its outer marginal portion is disposed in engagement with the valve seat 52. The replenishing valve member 54 includes depending arms 56 which extend through a spring retainer 58 and are bent over to secure the spring retainer 58 for movement together with the valve member. A spring 60 is operatively arranged between the base member 48 and spring retainer 58 so as to resiliently urge the retainer 58 downwardly and hence the valve member 54 into engagement with the seat 52. Valve member 54 includes a central opening 62 which is adapted to cooperate with a ball compression valve member 64 slidably mounted within the central portion of the spring retainer 58. Valve 64 is resiliently urged upwardly by a spring 66 having its upper end engaged with the valve and its lower end seated on the spring retainer 58.

Referring now more particularly to FIG. 2, the details of construction of the improved spring pressed piston compression valve mechanism 34 embodying the principles of the present invention are shown therein. In this regard it will be noted that the piston rod 24 has its lower end formed of reduced diameter defining a downwardly facing shoulder 68. The lower extremity of the piston rod is exteriorly threaded to engage within an interior thread 70 formed on an upper portion 72 of the piston 14. The mechanism 34 includes a spring mounting disc 74 having a central opening 76 therein adapted to engage over the exteriorly threaded lower end of the piston rod so as to be disposed in abutting engagement with shoulder 68. The threads 70 in the piston portion 72 render the piston 14 functionally equivalent to a nut operable to retain the washer 74 in engagement with the shoulder 68. Washer 74 may be provided with a series of annularly spaced oil passages 78. As best shown in FIG. 1, when the piston 14 is assembled on the piston rod 24 with the washer 74 as aforesaid, the rebound space 16 is communicated with the central opening 38 formed in the piston by a series of radially extending openings 80 in the piston 24 above the shoulder 68, the inner ends of which communicate with an upwardly extending bore 82 formed coaxially in the piston rod.

As best shown in FIG. 2, the piston 14 has a main body portion, the exterior periphery of which is formed with a series of annularly spaced longitudinally extending slots 84. Slots 84 provide paths for the passage of hydraulic fluid upwardly between the interior periphery of the tubular member 12 and the exterior periphery of the piston 14 which leads to an upwardly facing annular valve seat 86 surrounding the lower extremity of the upwardly projecting piston portion 72. Disposed above the valve seat 86 is an annular carrier, generally indicated at 88. The carrier 88 includes a cylindrical wall portion 90 having an annular flange portion 92 extending radially outwardly from the upper end thereof. The lower edge of the cylindrical wall portion 90 is adapted to engage the valve seat 86. If desired, slots 94 are formed in this surface to provide for flow control in accordance with the teachings contained in the aforesaid Patriquin U.S. Pat. No. 2,507,267.

An annular seal is disposed outwardly of the cylindrical wall 90 of the carrier and between the annular flange portion 92 thereof and the annular seat 86. In accordance with the principles of the present invention, the annular seal is in the form of a split metal ring 96, the dimensions of which are such that the split ring is substantially closed when the periphery of the split ring is in engagement with the interior periphery of the inner tubular member 12. The thickness or vertical dimension of the split ring 96 is slightly less than the vertical dimension between the lower edge of the cylindrical wall 90 of the carrier which engages the annular seat 86 and the lower surface of the flange portion 92 of the carrier. The arrangement is such that during compression the split ring 96 can move upwardly with respect to the piston 14 from a position in which the lower surface thereof engages the annular seat as shown in FIG. 1 to a position in which the upper surface thereof engages the lower surface of the annular flange 92, as shown in FIG. 3, thus uncovering the slots 94 in the carrier and permitting flow of liquid therethrough during the initial stages of compressive movement until the entire sealing ring 96 and carrier 88 are moved in a direction away from the annular seat 86, the extreme position of which is shown in FIG. 4.

An important aspect of the mechanism 34 of the present invention is the manner in which the split ring 96 and carrier 88 are resiliently urged downwardly into engagement with the annular seat 86 on the piston. To this end there is provided a lower spring supported member, generally indicated at 98. This member includes an outer cylindrical peripheral wall portion 100 having an annular flange 102 extending radially inwardly from the lower end thereof. Extending inwardly from the annular flange 102 is a series of integral annularly spaced generally semi-circular spring supporting portions 104. The portions 104 are arranged to generally mate with a corresponding series of outwardly facing cylindrically arcuate surfaces 106 formed in the exterior periphery of the upwardly projecting piston portion 72. Preferably, there are six spring supporting portions 104 provided in the spring support member 98 and a corresponding six arcuate surfaces 106 formed in the upper piston portion 72 for the purpose of receiving six coil springs 108. The manner in which the various components of the mechanism 34 are assembled is shown in FIGS. 1, 3 and 4, it being noted that each of the arcuate surfaces 106 serves to guidingly position an associated coil spring 108 along its exterior periphery against movement in every direction except radially outwardly. The peripheral wall 100 of the spring support 98 serves to guidingly position the springs against movement radially outwardly. It will be noted that the upper end of each spring 108 engages the lower surface of the washer 74 whereas the lower end of each spring engages an associated spring support portion 104 of the spring support member 98. Moreover, the lower surface of flange 102 of the spring support member 98 engages the upper surface of the flange 92 of the carrier so as to resiliently urge the lower edge of the cylindrical wall of the latter into engagement with the annular valve seat 86 on the piston 14.

It will be noted that during downward compressive movement of the piston 14 hydraulic fluid within the compression space 18 of the unit will flow upwardly into the rebound space under the control of the piston valve mechanism 34 and also into the replenishing space 34 through opening 62 under the control of base compression valve 64. The function of the piston valve mechanism 34 during this movement as briefly indicated is as follows. Piston slots 84 provide for the flow of hydraulic fluid from the compression space 18 upwardly therethrough into communication with the lower surface of the split ring 96. Ring 96 is therefore initially moved upwardly from engagement with the annular valve seat 86 as shown in FIG. 1 until it engages the lower surface of the annular flange 92 of the carrier 98 as shown in FIG. 3. This movement uncovers the slots 94 in the cylindrical wall portion of the carrier, enabling control of the flow to be initially through the slots 94. As the pressure increases, annular seal 96 is moved upwardly carrying with it the carrier 88 and spring support 98 to depress the six annularly spaced coil springs 108 as shown in FIG. 4.

The provision of six springs constitutes an improvement over the usual single annular coil spring which is provided as, for example, in the aforesaid U.S. Pat. No. 2,507,267. The total vertical height of the six springs can be considerably less than the vertical height of a single spring and still provide the same spring effect. This permits a reduction in the overall length of the piston and provides a greater degree of uniformity in total spring force. Moreover, the arrangement provides for some variation in the spring force provided by simply eliminating or removing three of the springs, leaving a symmetrical spring pattern. This spring variation is achieved with an invention of only a single spring part. Where a single spring is utilized, spring variation can only be obtained by stocking single springs of different strengths. The provision of the split metal sealing ring 96 is considered desirable since it eliminates the utilization of an elastomeric O-ring and a separate anti-extrusion washer therefor. Preferably, the metal ring is formed of cast iron and has its exterior periphery of spherical configuration, as indicated at 110, the axis of the spherical surface being the center of the ring when compressed.

It will be understood that the arrangement is such that during the upward movement of the piston 14 there is provided by the split ring 96 both a peripheral seal with the interior periphery of the tubular member 12 and a face seal with the annular seat 86 preventing flow of fluid past the exterior periphery of the piston 14 thus forcing all of the flow from the rebound space 16 to the compression space 18 to take place through the central opening 38 under the control of the valve 40. Flow of hydraulic fluid from the replenishing space to the compression space to compensate for the piston rod displacement is through opening 50 past replenishing valve 54.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a hydraulic shock absorber adapted to be connected between the sprung and unsprung masses of a vehicle including a tubular member defining a cylindrical chamber, a piston slidably mounted within said cylindrical chamber, a piston rod extending from one side of said piston outwardly from one end of said tubular member, closure means on said one end of said tubular member closing the adjacent end of said tubular member and slidably sealingly engaging said piston rod, end closure means on the opposite end of said tubular member, connecting means for connecting said shock absorber operatively between said masses, hydraulic fluid filling rebound and compression spaces within said cylindrical chamber on the piston rod side of said piston and on the opposite side thereof respectively, said piston having passage means therethrough, rebound valve means disposed in cooperating relation with said passage means to control flow of fluid from said rebound space to said compression space, a compression valve mechanism carried by said piston for controlling flow of fluid from said compression space to said rebound space peripherally across said piston, and means to accommodate the flow of hydraulic fluid resulting from piston rod displacement, the improvement which comprises said compression valve mechanism including an upwardly facing annular valve seat on said piston, said piston having an annular portion disposed inwardly of said annular valve seat and extending thereabove, said piston rod having a lower end portion of reduced diameter defining a downwardly facing shoulder, a washer member engaging said shoulder, said piston annular portion threadedly engaging the exterior periphery of the lower end portion of said piston rod and maintaining said washer member in engagement with said piston rod shoulder, the exterior periphery of said piston annular portion including a series of equally annularly spaced radially outwardly facing arcuate surfaces, a series of equally annularly spaced coil springs mounted with their upper ends engaging said washer member and their inner exterior peripheries adjacent a corresponding series of equally spaced arcuate surfaces, a lower spring support including an outer cylindrical peripheral wall disposed in surrounding relation to the outer exterior peripheries of said series of coil springs, an inwardly projecting flange and a series of radially inwardly projecting portions extending toward and corresponding to said arcuate surfaces, an equal annularly spaced series of which are in supported relation to the lower ends of said series of coil springs and an annular seal and carrier assembly between the lower surface of said spring support flange and said upwardly facing valve seat sealingly engaging the interior periphery of said inner tubular member.

2. The improvement as defined in claim 1 wherein there are six arcuate surfaces in said series of arcuate surfaces and three or six coil springs in said series of coil springs.

3. A direct acting hydraulic shock absorber adapted to be connected between the sprung and unsprung masses of a vehicle comprising:
  inner and outer tubular members,
  said inner tubular member defining a cylindrical chamber,
  a piston slidably mounted within said cylindrical chamber,
  a piston rod extending from one side of said piston outwardly from one end of said inner tubular member,
  closure means on said one end of said inner tubular member closing the adjacent end of said outer tubular member and slidably sealingly engaging said piston rod, connecting means on the end of said piston rod for connecting said shock absorber to one of said masses, an end closure on the opposite end of said outer tubular member, connecting means on said end closure for connecting said shock absorber to the other of said masses, hydraulic fluid filling rebound and compression spaces within said cylindrical chamber on the piston rod side of said piston and on the opposite side thereof respectively and partially filling an annular reservoir space between said inner and outer tubular members, said piston having a central passage therethrough, rebound valve means in said piston disposed in cooperating relation with said central passage, said piston having compression valve mechanism radially outwardly of said central passage to control flow, compression valve means between said compression space and said reservoir space, and replenishing valve means between said compression space and said reservoir space, the improvement which comprises said piston compression valve mechanism including an upwardly facing annular valve seat on said piston, said piston having an annular portion disposed inwardly of said annular valve seat and extending thereabove, said piston rod having a lower end portion of reduced diameter defining a downwardly facing shoulder, a washer member engaging said shoulder, said piston annular portion threadedly engaging the exterior periphery of the lower end portion of said piston rod and maintaining said washer member in engagement with said piston rod shoulder, the exterior periphery of said piston annular portion including a series of equally annularly spaced radially outwardly facing arcuate surfaces, a series of equally annularly spaced coil springs mounted with their upper ends engaging said washer member and their inner exterior peripheries adjacent a corresponding series of equally spaced arcuate surfaces, a lower spring support including an outer cylindrical peripheral wall disposed in surrounding relation to the outer exterior peripheries of said series of coil springs, an inwardly projecting flange and a series of radially inwardly projecting portions extending toward and corresponding to said arcuate surfaces, an equal annularly spaced series of which are in supported relation to the lower ends of said series of coil springs and an annular seal and carrier assembly between the lower surface of said spring support flange and said upwardly facing valve seat sealingly engaging the interior periphery of said inner tubular member.

4. The improvement as defined in claim 3 wherein there are six arcuate surfaces in said series of arcuate surfaces and three or six coil springs in said series of coil springs.

5. The improvement as defined in claim 1, 2 or 4 wherein said annular seal and carrier assembly includes a carrier having a cylindrical wall portion and an annular flange portion extending radially outwardly from the upper edge of said cylindrical wall portion, the lower edge of said carrier being normally biased by said springs into engagement with said annular seat and having slot means formed therein.

6. The improvement as defined in claim 5 wherein said annular seal and carrier assembly also includes a metallic split ring seal having its lower surface engageable with said upwardly facing valve seat, its interior periphery disposed adjacent the exterior periphery of the cylindrical wall portion of said carrier, and its exterior periphery disposed in sealing engagement with the interior periphery of said inner tubular member.

7. The improvement as defined in claim 6 wherein said split ring seal has a vertical thickness dimension less than the vertical dimension between the lower surface of the flange portion of said carrier and the lower edge of the cylindrical wall thereof.

8. The improvement as defined in claim 7 wherein said split ring seal has a spherically shaped exterior peripheral surface.

9. The improvement as defined in claim 6 wherein said split ring seal is cast iron.

* * * * *